United States Patent [19]
Redekop

[11] Patent Number: 5,957,216
[45] Date of Patent: Sep. 28, 1999

[54] RESETTABLE BREAKAWAY SYSTEM

[75] Inventor: John Redekop, Plum Coulee, Canada

[73] Assignee: G.A.P. ag, Fargo, N. Dak.

[21] Appl. No.: 08/969,750

[22] Filed: Nov. 13, 1997

Related U.S. Application Data

[63] Continuation-in-part of application No. 08/617,351, Mar. 18, 1996, Pat. No. 5,785,128.
[51] Int. Cl.$^6$ .................................................. A01B 69/02
[52] U.S. Cl. .......................... 172/126; 172/265; 172/271
[58] Field of Search .................................... 172/126, 271, 172/264, 265

[56] References Cited

U.S. PATENT DOCUMENTS

| | | | |
|---|---|---|---|
| 4,030,551 | 6/1977 | Boetto et al. | 172/126 |
| 4,147,305 | 4/1979 | Hunt | 172/271 X |
| 4,825,957 | 5/1989 | White et al. | 172/271 X |
| 5,408,756 | 4/1995 | Wahls | 172/126 X |
| 5,485,796 | 1/1996 | Bassett | 172/126 X |

FOREIGN PATENT DOCUMENTS

| | | | |
|---|---|---|---|
| 9610/27 | 3/1928 | Australia | 172/126 |
| 1392186 | 4/1975 | United Kingdom | 172/126 |

OTHER PUBLICATIONS

John Deere 7000 Conservation 4–Row and 6–Row Narrow Max–Emerge Drawn Planters, May 1982.

*Primary Examiner*—Christopher J. Novosad
*Attorney, Agent, or Firm*—Michael S. Neustel

[57] ABSTRACT

A breakaway system which is easily reset by a user and does not utilize shear pins or spring loaded tension devices. The inventive device includes a support member having a U-shaped cross-sectional area, an inner member attached to the support member, an outer member pivotally attached to the support member opposite of the inner member, a lip portion attached to the outer member which projects through an opening with the support member, and a spring leveraged arm pivotally attached to the inner member containing a roller opposite thereof which engages a swaged face of the lip portion. The lip portion preferably has a ramped face opposite of the swaged face which allows the lip portion to be reset behind the roller of the arm without requiring the replacement of any components.

10 Claims, 5 Drawing Sheets

RESETTABLE BREAKAWAY SYSTEM

CROSS-REFERENCE TO RELATED PATENT APPLICATION

This is a continuation-in-part of application Ser. No. 08/617,351, filed Mar. 18, 1996, now U.S. Pat. No. 5,785,128.

BACKGROUND OF THE INVENTION

1. Field of the Invention

The present invention relates generally to breakaway devices and more specifically it relates to a resettable breakaway system which is easily reset by a user without utilizing inefficient shear pins or spring loaded tension elements.

2. Description of the Prior Art

There are numerous breakaway devices. For example, U.S. Pat. No. 4,825,957 and Canadian Patent 1,202,529 are illustrative of such prior art. Such prior utilize either a shear bolt or a spring loaded tension element. These inventions are expensive to construct and are inconvenient to reset.

While these devices may be suitable for the particular purpose to which they address, they are not as suitable for providing a reliable resettable breakaway device which is easily resettable by a user. Shear pin devices require the user to maintain a supply of shear pins with them at all times or the user will have to terminate working in the field to locate a shear pin once the shear pin has been broken. Further, the shear pin devices are not adjustable depending upon the type of arm being protected. Also it is difficult to determine how much force will be required to breakaway a particular shear pin inserted or common bolts may be inserted which have differing breakaway characteristics. The spring loaded tension elements provide increasing tension on the arm when encountering an object in a field, thereby not allowing the arm to freely breakaway from the object. This can lead to the arm becoming entangled with the object thereby damaging the arm if the user does not visually detect the problem.

In these respects, the breakaway system according to the present invention substantially departs from the conventional concepts and designs of the prior art, and in so doing provides an apparatus primarily developed for the purpose of providing a breakaway device which is easily reset by a user and which does not utilize shear pins and spring loaded tension elements which have been proven to be unreliable in protecting the arm of an implement or field marker.

SUMMARY OF THE INVENTION

A primary object of the present invention is to provide a breakaway system that will overcome the shortcomings of the prior art devices.

Another object is to provide a breakaway system that does not utilize shear pins or spring loaded tension devices.

An additional object is to provide a breakaway system that freely breakaways when the arm engages an object.

A further object is to provide a breakaway system that is adjustable in the amount of force required to breakaway.

Another object is to provide a breakaway system that is easily reset after breaking away from the arm engaging an object.

Another object is to provide a breakaway system that is suitable for field markers, shanks, and other arms of equipment which are susceptible to breakage do to engaging an object.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
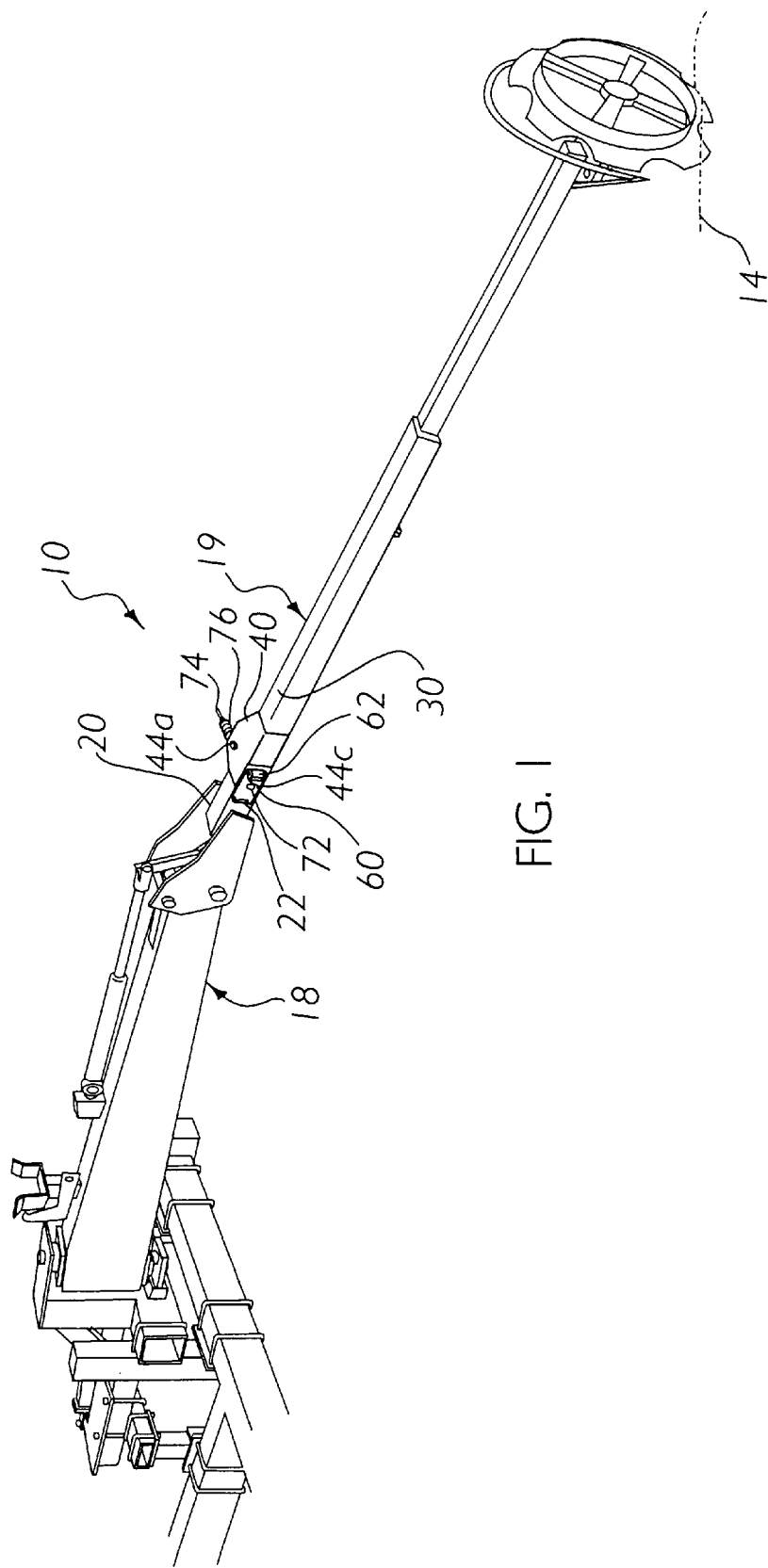
FIG. 1 is an upper perspective view of the present invention locked in position within a field marker.

Turning now descriptively to the drawings, in which similar reference characters denote similar elements throughout the several view, FIGS. 1 through 7 illustrate a breakaway system 10, which comprises a support member 40 having a U-shaped cross-sectional area, an inner member 20 attached to the support member 40, an outer member 30 pivotally attached to the support member 40 opposite of the inner member 20, a lip portion 50 attached to the outer member 30 which projects through an opening 42 with the support member 40, and a spring leveraged arm 60 pivotally attached to the inner member 20 containing a roller 62 opposite thereof which engages a swaged face 52 of the lip portion 50. The lip portion 50 preferably has a ramped face 56 opposite of the swaged face 52 which allows the lip portion 50 to be reset behind the roller 62 of the arm 60 without requiring the replacement of any components. The breakaway system 10 may be utilized on field markers, shanks, or any other arm component which is susceptible of breakaway from engaging an object within a ground surface 14.

Figure 2:
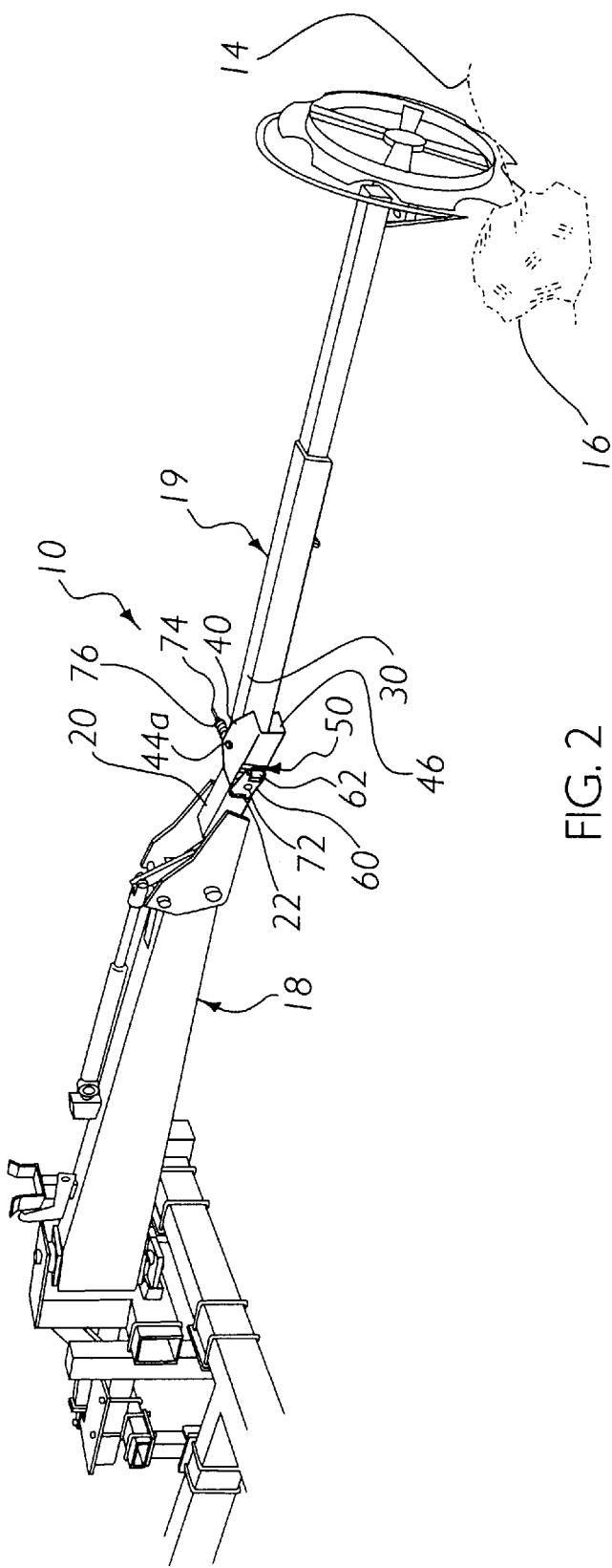
FIG. 2 is an upper perspective view of the present invention released while engaging a rock.

As best shown in FIGS. 1 and 2 of the drawings, the breakaway system 10 is positioned within a field marker comprised of an inner wing 18 and an outer wing 19. The breakaway system 10 is more particularly positioned between the inner member 20 and the outer member 30 of the outer wing 19. This allows the outer wing 19 to separate into two pivotally connected sections when the outer wing 19 engages a rock 16 or other relatively immovable object.

Figure 3:
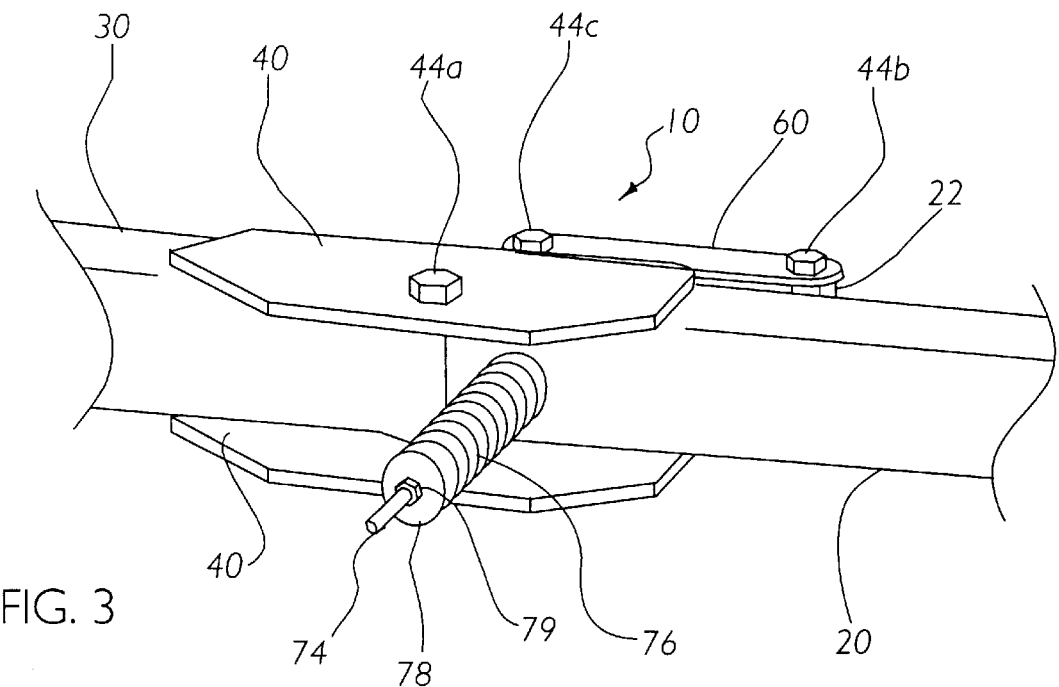
FIG. 3 is a magnified upper rear view of the present invention.
Figure 4:
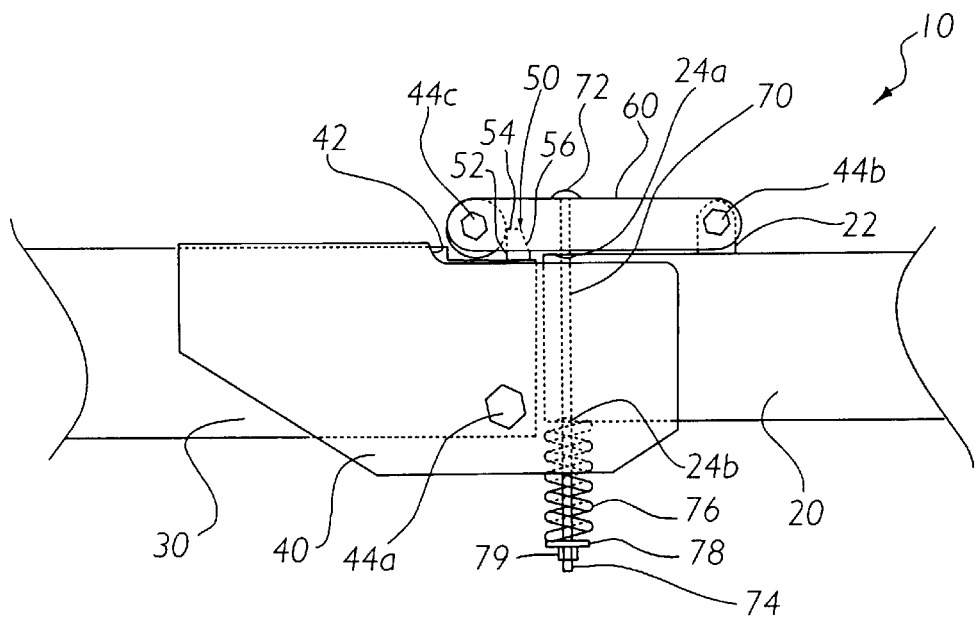
FIG. 4 is a top view of the present invention locked.
Figure 5:
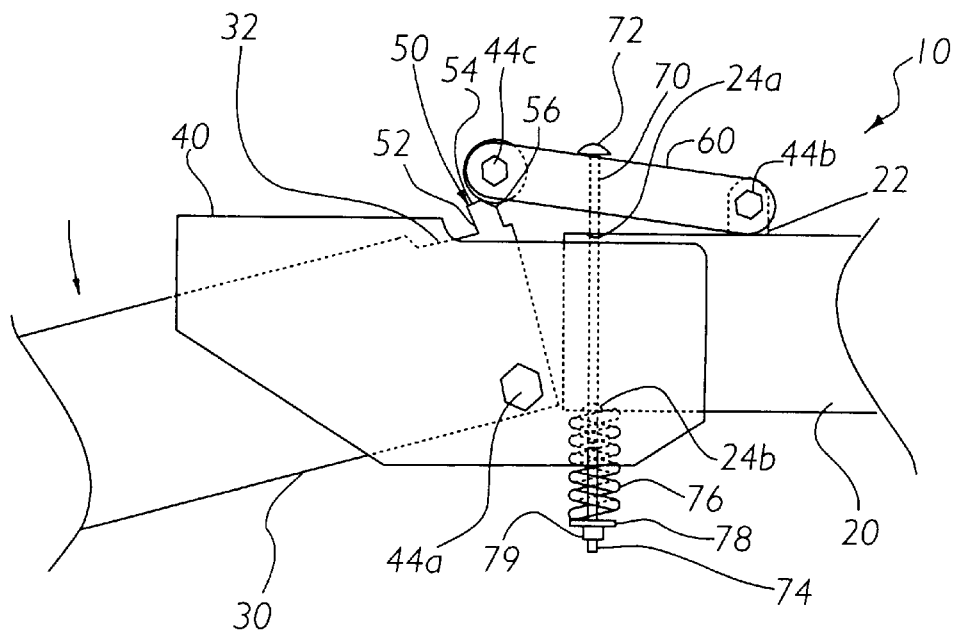
FIG. 5 is a top view of the present invention nearly released.
Figure 6:
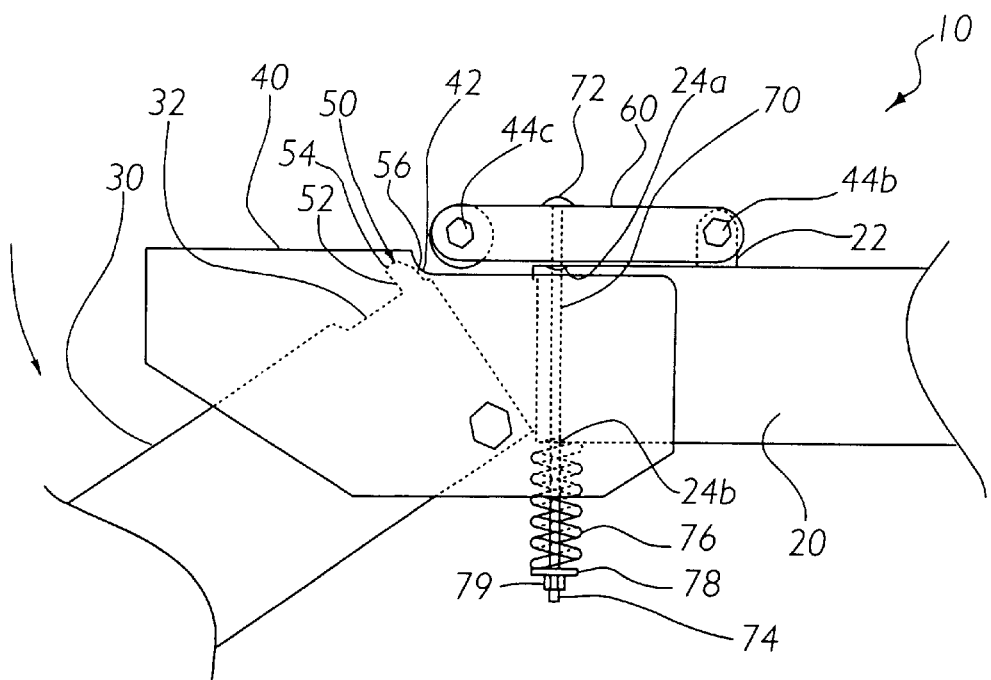
FIG. 6 is a top view of the present invention fully released.

As best shown in FIGS. 3 through 6 of the drawings, the inner member 20 is attached to the support member 40. The support member 40 preferably has a U-shaped cross-sectional area as shown in FIG. 3, which fixedly receives the inner member 20. The support member 40 includes an opening 42 projecting into a front surface as best shown in FIGS. 1 and 2 of the drawings. As shown in FIGS. 4 through 6, the outer member 30 is pivotally attached within the U-shaped channel 46 of the support member 40 near the inner member 20 by a fastener 44a. The outer member 30 is free to move with respect to the support member 40 and can pivot up to approximately 90 degrees. The outer member 30 is substantially parallel to the inner member 20 when in the locked position as shown in FIG. 4 of the drawings. The outer member 30 includes a notch 32, as best shown in FIG. 4, for receiving the roller 62.

As best shown in FIGS. 4 through 6, a tongue member 22 is attached to a frontal portion of the inner member 20. The arm 60 is pivotally attached to the tongue member 22 at one end by a frontal 44b. A roller 62 is rotatably attached to the arm 60 opposite of the tongue member 22 by a fastener 44c as best shown in FIGS. 4 through 6 of the drawings. The roller 62 projects a finite distance into the opening 42 as best shown in FIGS. 4 through 6.

As shown in FIGS. 3 through 6 of the drawings, a shaft 70 slidably projects through the arm 60 and then through the inner member 20 through apertures 24a–b. The shaft 70 has a flanged end 72 which engages a front surface of the arm 60. The shaft 70 has a threaded end 74 opposite of the flanged end 72. A compression spring 76 is slidably positioned about the threaded end 74 portion of the shaft 70 as best shown in FIG. 3 and a nut 79 and washer 78 combination are utilized to retain the compression spring 76 in engagement with the inner member 20. The user may adjust the amount of tension from the compression spring 76 by adjusting the position of the nut 79. This force from the spring forces the arm 60 towards and through the support member 40.

Figure 7:
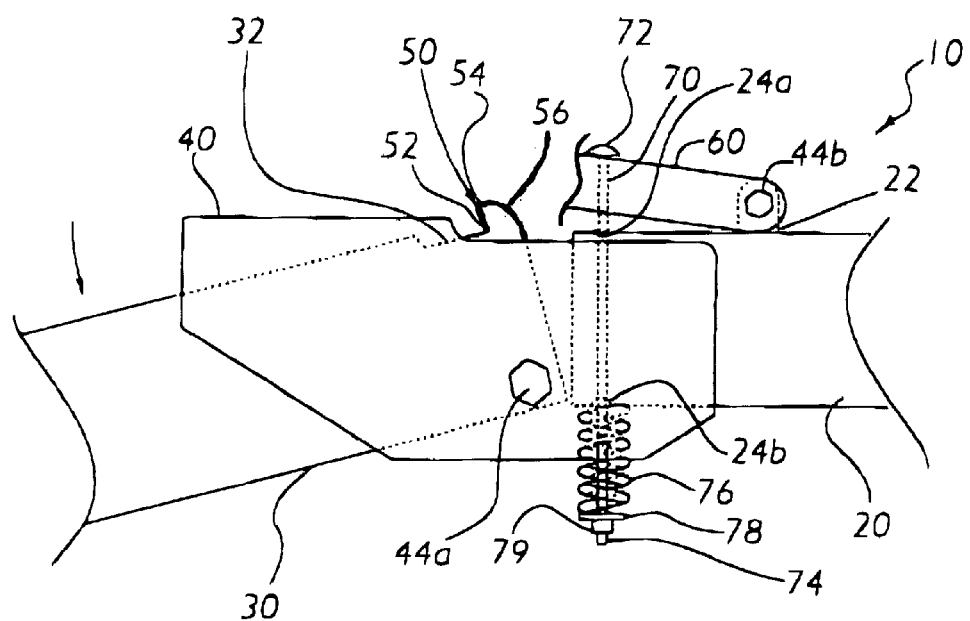
FIG. 7 is a top view of the present invention showing an arcuate shaped ramp.

The lip portion 50 is attached to a front portion of the outer member 30 near the inner member 20 as best shown in FIGS. 4 through 6 of the drawings. The lip portion 50 projects through the opening 42 when the breakaway system 10 is in the locked position. The lip portion 50 has a swaged face 52 which catchably engages the roller 62 as shown in FIG. 4. The lip portion 50 also has a swaged portion 54 adjacent the swaged face 52 and opposite of the outer member 30 as best shown in FIG. 5. The swaged portion 54 is slightly closer to the outer member 30 than a center point of the roller 62 is when the breakaway system 10 is in the locked position, wherein the swaged face 52 is substantially parallel to a tangential plane of the engaged portion of the roller 62. The lip portion 50 further comprises a ramped face 56 opposite of the swaged face 52 for allowing the user to easily reset the breakaway system 10 after it is released by gradually elevating the roller 62. The ramped face 56 may be flat as shown in FIGS. 4 through 6. The ramped face 56 may also have an arcuate shape as shown in FIG. 7 of the drawings.

In use, the breakaway system 10 is maintain in the locked position until a substantial rearward force is applied to the outer member 30. A substantial rearward force is required to overcome the force applied to the roller 62 by the compression spring 76. The rearward force manipulates the outer member 30 away from the inner member 20. The swaged face 52 of the lip portion 50 is forced towards the roller 62 as the outer member 30 is pivoted from the rearward force. This forces the roller 62 and the arm 60 away from the support member 40 and compresses the compression spring 76 as best shown in FIG. 5 of the drawings. Once the swaged portion 54 of the lip portion 50 engages the roller 62 as shown in FIG. 5, the outer member 30 may be easily pivoted outwardly from the support member 40 to the released position as shown in FIG. 6 of the drawings. When the roller 62 engages the ramped face 56 of the lip portion 50, the outer member 30 is actually forced rearwardly from the force of the roller 62. Once the outer member 30 is in the released position, the outer member 30 may pivot up to approximately 90 degrees or more from its original position, thereby ensuring adequate clearance from the rock 16 or other object struck by the outer member 30. To reset, the user simply manually manipulates the outer member 30 so that the ramped face 56 is juxtaposed to an edge of the roller 62. The user then further manipulates the outer member 30 so that the roller 62 is ramped up the ramped face 56, thereby dramatically decreasing the amount of force required to reset the breakaway system 10. The user continues to manipulate the outer member 30 until the roller 62 member is juxtaposed to the swaged face 52 of the lip portion 50 thereby ensuring it is in the locked position as shown in FIG. 4.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A resettable breakaway device, comprising:
   an inner member having a first end and a second end;
   an outer member having a proximal end and a distal end;
   said proximal end is pivotally attached to said second end of said inner member;
   a releasable engaging means attached to said inner member and in releasable engagement to said outer member for retaining said outer member substantially parallel to said inner member in a locked position; and
   wherein said releasable engaging means comprises:
   a lip portion having a first end and a second end, wherein said first end of said lip portion is attached to a side of said outer member adjacent said proximal end;
   a leverage means attached to said inner member; and
   an engaging member attached to said leverage means, wherein said leverage means applies a force upon said engaging member for retaining said engaging member in contact with said lip portion thereby retaining said outer member in said locked position.

2. The resettable breakaway device of claim 1, wherein said lip portion includes a substantially swaged face which is in engagement with said engaging member when in said locked position.

3. The resettable breakaway device of claim 2, wherein said engaging member is comprised of a roller rotatably attached to said leverage means.

4. The resettable breakaway device of claim 3, wherein said second end of said lip portion is below a center point of said roller.

5. The resettable breakaway device of claim 4, wherein said lip portion includes an arcuate shaped side opposite of said swaged face for allowing a user to easily reposition said outer member into said locked position.

6. The resettable breakaway device of claim 4, wherein said lip portion includes a ramped face opposite of said swaged face for allowing a user to easily reposition said outer member into said locked position.

7. The resettable breakaway device of claim 6, wherein said leverage means comprises:

an arm pivotally attached to said inner member at one end and rotatably securing said roller at an opposite end thereof; and a spring means attached between said inner member and said arm, wherein said spring means applies said force to said arm toward said lip portion.

8. The resettable breakaway device of claim 7, wherein said spring means comprises:

a shaft engaged at one end to said arm and slidably projecting through said inner member; and a compression spring attached to an end of said shaft opposite of said arm and in engagement with said inner member for applying said force upon said arm towards said inner member.

9. The resettable breakaway device of claim 8, wherein said force from said compression spring is adjustable by adjusting a position of a nut threadably fastened to said shaft.

10. The resettable breakaway device of claim 9, including a support member attached to said inner member and extending away therefrom for supporting said outer member when in said locked position.

\* \* \* \* \*